(12) United States Patent
Stoner et al.

(10) Patent No.: US 10,587,427 B2
(45) Date of Patent: Mar. 10, 2020

(54) EQUITABLE ELECTRONIC GROUP COMMUNICATION SESSION MANAGEMENT USING AN ORDERED LIST TO PROVIDE PREDETERMINED EQUAL AMOUNT OF EXCLUSIVE TIME TO EACH OF THE PARTICIPANTS

(71) Applicant: Talking Stick, Inc., Winter Park, FL (US)

(72) Inventors: Theodore Stoner, Winter Park, FL (US); Benjamin Gauthier, Winter Park, FL (US); Jacob Quattrocchi, Winter Park, FL (US); Bryan Eaton, Winter Park, FL (US)

(73) Assignee: Talking Stick, Inc., Winter Park, FL (US)

( * ) Notice: Subject to any disclaimer, the term of this patent is extended or adjusted under 35 U.S.C. 154(b) by 109 days.

(21) Appl. No.: 15/487,948

(22) Filed: Apr. 14, 2017

(65) Prior Publication Data

US 2017/0302466 A1 Oct. 19, 2017

Related U.S. Application Data

(60) Provisional application No. 62/322,755, filed on Apr. 14, 2016.

(51) Int. Cl.
*H04L 12/18* (2006.01)
*H04L 29/08* (2006.01)
*H04L 29/06* (2006.01)

(52) U.S. Cl.
CPC ...... *H04L 12/1822* (2013.01); *H04L 12/1827* (2013.01); *H04L 67/141* (2013.01); *H04L 67/42* (2013.01)

(58) Field of Classification Search
CPC ... H04L 12/1822; H04L 67/141; H04L 67/42; H04L 12/1827
See application file for complete search history.

(56) References Cited

U.S. PATENT DOCUMENTS

| 6,564,261 B1 * | 5/2003 | Gudjonsson | ........ H04L 12/1818 370/261 |
| 6,845,393 B1 * | 1/2005 | Murphy | .................. G06F 9/548 709/201 |

(Continued)

OTHER PUBLICATIONS

The Trouser Rollers. "Global Change Seminar "It's Your Move" Group Technique", 2006, Accessed Dec. 15, 2018 (Year: 2006).*

(Continued)

*Primary Examiner* — Daniel C. Murray
(74) *Attorney, Agent, or Firm* — Sheridan Ross P.C.

(57) ABSTRACT

Once a group communication such as a video conference has been initiated, embodiments of the present disclosure provide for equitably managing the conference so that each participant can be given a chance to speak or contribute. For example, and according to one embodiment, the participants can be placed into a rotating queue based upon the order in which they joined the conference. As the conference progresses, each participant can be allowed to speak, while the other participants are muted, for up to a predetermined amount of time. Once that time expires, or the speaker yields the remaining time, the next participant in the rotating queue can be allowed to speak for up to the same predetermined amount of time. This rotation can continue for up to a predetermined number of rotations, a predetermined amount of time for the conference, or until the participants otherwise end the conference.

30 Claims, 8 Drawing Sheets

(56) References Cited

U.S. PATENT DOCUMENTS

| | | | | |
|---|---|---|---|---|
| 6,922,547 B2* | 7/2005 | O'Neill | H04W 72/0413 | 455/17 |
| 7,079,857 B2* | 7/2006 | Maggenti | H04L 63/0428 | 370/447 |
| 7,130,282 B2* | 10/2006 | Black | H04L 12/1822 | 370/296 |
| 7,328,239 B1* | 2/2008 | Berberian | H04M 3/42221 | 709/204 |
| 7,353,252 B1* | 4/2008 | Yang | G06Q 10/10 | 709/204 |
| 7,408,948 B2* | 8/2008 | Lopponen | H04M 3/42 | 370/310 |
| 7,529,558 B1* | 5/2009 | Blair | H04W 4/02 | 455/519 |
| 7,580,375 B1* | 8/2009 | Friedrich | H04L 12/1822 | 348/14.01 |
| 7,761,110 B2* | 7/2010 | Chotai | H04W 76/45 | 455/519 |
| 8,077,634 B2* | 12/2011 | Maggenti | H04M 3/56 | 370/260 |
| 8,712,019 B2* | 4/2014 | Anchan | H04M 3/2281 | 379/35 |
| 9,560,099 B2* | 1/2017 | Lindner | H04W 4/08 | |
| 9,730,031 B2* | 8/2017 | Brewer | H04L 12/1822 | |
| 9,979,769 B2* | 5/2018 | Pilli | H04L 65/604 | |
| 2002/0172169 A1* | 11/2002 | Rosen | H04M 3/42 | 370/335 |
| 2004/0057449 A1* | 3/2004 | Black | H04L 12/1822 | 370/432 |
| 2004/0071099 A1* | 4/2004 | Costa-Requena | H04L 12/1818 | 370/260 |
| 2006/0053225 A1* | 3/2006 | Poikselka | H04L 12/1818 | 709/227 |
| 2006/0058052 A1* | 3/2006 | Plestid | H04W 72/005 | 455/519 |
| 2006/0154681 A1* | 7/2006 | Park | H04W 4/10 | 455/518 |
| 2006/0235932 A1* | 10/2006 | Celi, Jr. | H04L 12/1822 | 709/207 |
| 2006/0244818 A1* | 11/2006 | Majors | H04L 12/1822 | 348/14.08 |
| 2007/0021136 A1* | 1/2007 | Allen | H04B 1/3833 | 455/518 |
| 2007/0263824 A1* | 11/2007 | Bangalore | H04L 12/1827 | 379/202.01 |
| 2007/0281723 A1* | 12/2007 | Chotai | H04W 76/45 | 455/518 |
| 2008/0031433 A1* | 2/2008 | Sapp | H04L 12/1818 | 379/92.03 |
| 2008/0136897 A1* | 6/2008 | Morishima | H04L 12/1822 | 348/14.08 |
| 2008/0172463 A1* | 7/2008 | Qin | H04L 12/1822 | 709/204 |
| 2009/0300157 A1* | 12/2009 | Longeanie | H04L 12/1822 | 709/223 |
| 2010/0016007 A1 | 1/2010 | Satake | | |
| 2010/0124321 A1* | 5/2010 | Alexandrov | H04M 3/56 | 379/202.01 |
| 2010/0257461 A1* | 10/2010 | Brewer | H04L 12/1822 | 715/755 |
| 2011/0093537 A1* | 4/2011 | Kowalewski | H04L 12/1822 | 709/204 |
| 2012/0190394 A1* | 7/2012 | Kwon | H04W 72/005 | 455/509 |
| 2013/0027508 A1* | 1/2013 | Charish | H04M 3/56 | 348/14.08 |
| 2013/0179941 A1* | 7/2013 | McGloin | G06Q 10/10 | 726/3 |
| 2013/0315107 A1* | 11/2013 | Lindner | H04L 65/4061 | 370/277 |
| 2013/0315108 A1* | 11/2013 | Lindner | H04W 4/08 | 370/277 |
| 2013/0316686 A1* | 11/2013 | Subbaramoo | H04W 8/22 | 455/418 |
| 2013/0316687 A1* | 11/2013 | Subbaramoo | H04M 1/605 | 455/418 |
| 2014/0141851 A1* | 5/2014 | Rubin | H04L 12/1818 | 463/9 |
| 2015/0039691 A1* | 2/2015 | Sharma | H04L 65/1016 | 709/204 |
| 2016/0127683 A1* | 5/2016 | Hanson | H04N 7/15 | 348/14.08 |
| 2017/0195373 A1* | 7/2017 | Toh | H04L 65/1089 | |

OTHER PUBLICATIONS

O'Berry, Denise. "Open Communicaion with a Talking Stick". Aug. 4, 2010, Quick Base Blog, Accessed Dec. 15, 2018 (Year: 2010).*

International Search Report and Written Opinion for International (PCT) Patent Application No. PCT/US2017/027732, dated Jun. 29, 2017 8 pages.

International Preliminary Report on Patentability for International (PCT) Patent Application No. PCT/US2017/027732, dated Oct. 25, 2018, 7 pages.

* cited by examiner

EQUITABLE ELECTRONIC GROUP COMMUNICATION SESSION MANAGEMENT USING AN ORDERED LIST TO PROVIDE PREDETERMINED EQUAL AMOUNT OF EXCLUSIVE TIME TO EACH OF THE PARTICIPANTS

CROSS REFERENCE TO RELATED APPLICATION

The present application claims the benefits of and priority, under 35 U.S.C. § 119(e), to U.S. Provisional Application No. 62/322,755 filed Apr. 14, 2016 by Stoner and entitled "Electronic Group Communication Methodologies" of which the entire disclosure is incorporated herein by reference for all purposes.

FIELD OF THE DISCLOSURE

Embodiments of the present disclosure relate generally to methods and systems for supporting and managing electronic group communication and more particularly to managing a multimedia group communication such as a video conference in an equitable manner to encourage and support exchange between participants.

BACKGROUND

Group communications, such as audio conferences, video conferences, and other electronic exchanges of media are increasingly common and supported in a variety of environments and through a wide range of devices. For example, users can easily initiate a video conference with friends, family, colleagues, and others through commonly available applications. However, group communications conducted in such a fashion are subject to some of the same problems as in-person communications, especially as the size of the group grows. Namely, speakers who are more outspoken than others may monopolize the time and prevent others from having a chance to speak. Overbearing or loud speakers can also inhibit the discussion. Cross-talk or side discussions can be distracting and disruptive. As a result, not everyone has an equal voice or even an opportunity to be heard. In some cases, speakers can be muted and/or the "floor" can be controlled to grant an exclusive speaking opportunity to a particular user or users. However, while such control can provide for an orderly discussion, it can be even more inequitable and further limit the ability of every to have a voice in the discussion. Hence, there is a need for improved methods and systems for managing a multimedia group communication such as a video conference in an equitable manner to encourage and support exchange between participants.

BRIEF SUMMARY

Embodiments of the disclosure provide systems and methods for managing an electronic group communication such as a video conference. Generally speaking, the communication can be managed to allow an equal opportunity for all participants to speak while maintaining a flow that keeps participants engaged and allows the discussion to be interactive. More specifically, once a group communication such as a video conference has been initiated, embodiments of the present disclosure provide for equitably managing the conference so that each participant can be given a chance to speak or contribute. For example, and according to one embodiment, the participants can be placed into a rotating queue based upon the order in which they joined the conference. As the conference progresses, each participant can be allowed to speak, while the other participants are muted, for up to a predetermined amount of time. Once that time expires, or the speaker yields the remaining time, the next participant in the rotating queue can be allowed to speak for up to the same predetermined amount of time. This rotation can continue for up to a predetermined number of rotations, a predetermined amount of time for the conference, or until the participants otherwise end the conference.

According to one embodiment, managing a group communication session can comprise receiving from a client device of an originator of the group communication session a request to initiate the group communication session. This can include an invitation or request to conduct a conference with another on or more participants. The one or more participants in the group communication session can be identified based on the request, e.g., by a user name, number, or other unique identifier. The identified one or more participants can be invited to join the group communication session. The group communication session can be initiated in response to receiving an acceptance message from a client device of at least one of the one or more participants. The group communication session can be managed to provide a substantially equal amount of exclusive time to each of the originator of the communication session and the at least one of the one or more participants.

Figure 1:
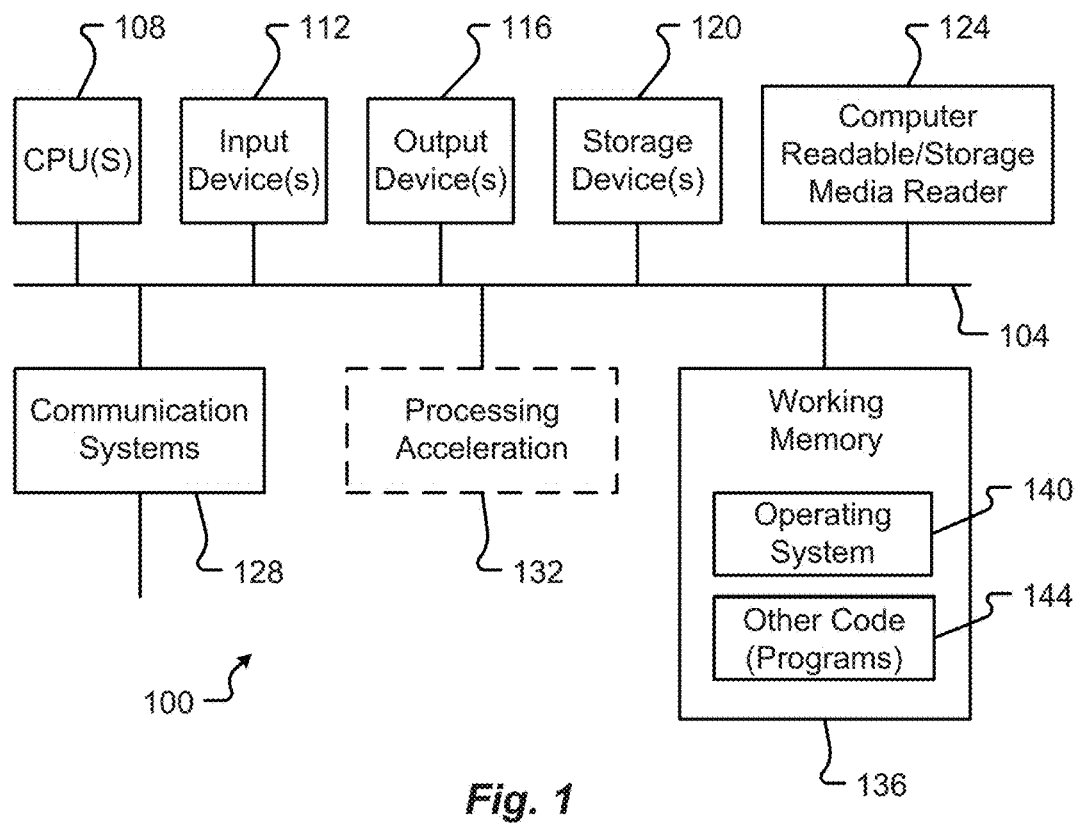
FIG. 1 is a block diagram illustrating components of an exemplary computing device which may be used to implement various embodiments of the present disclosure.

In the appended figures, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the second reference label.

DETAILED DESCRIPTION

In the following description, for the purposes of explanation, numerous specific details are set forth in order to provide a thorough understanding of various embodiments disclosed herein. It will be apparent, however, to one skilled in the art that various embodiments of the present disclosure may be practiced without some of these specific details. The ensuing description provides exemplary embodiments only, and is not intended to limit the scope or applicability of the disclosure. Furthermore, to avoid unnecessarily obscuring the present disclosure, the preceding description omits a number of known structures and devices. This omission is not to be construed as a limitation of the scopes of the claims. Rather, the ensuing description of the exemplary embodiments will provide those skilled in the art with an enabling description for implementing an exemplary embodiment. It should however be appreciated that the present disclosure may be practiced in a variety of ways beyond the specific detail set forth herein.

While the exemplary aspects, embodiments, and/or configurations illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices or collocated on a particular node of a distributed network, such as an analog and/or digital telecommunications network, a packet-switch network, or a circuit-switched network. It will be appreciated from the following description, and for reasons of computational efficiency, that the components of the system can be arranged at any location within a distributed network of components without affecting the operation of the system.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

As used herein, the phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising," "including," and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The term "computer-readable medium" as used herein refers to any tangible storage and/or transmission medium that participate in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored.

A "computer readable signal" medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

The terms "determine," "calculate," and "compute," and variations thereof, as used herein, are used interchangeably and include any type of methodology, process, mathematical operation or technique.

It shall be understood that the term "means" as used herein shall be given its broadest possible interpretation in accordance with 35 U.S.C., Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary of the disclosure, brief description of the drawings, detailed description, abstract, and claims themselves.

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Any combination of one or more computer readable medium(s) may be utilized. The computer readable medium may be a computer readable signal medium or a computer readable storage medium.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the disclosed embodiments, configurations, and aspects includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARIVI926EJ-S™ processors, other industry-equivalent processors, and may perform computational functions using any known or future-developed standard, instruction set, libraries, and/or architecture.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the aspects, embodiments, and/or configurations with reference to particular standards and protocols, the aspects, embodiments, and/or configurations are not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

Embodiments of the disclosure provide systems and methods for managing an electronic group communication such as a video conference. Generally speaking, the communication can be managed to allow an equal opportunity for all participants to speak while maintaining a flow that keeps participants engaged and allows the discussion to be interactive. More specifically, once a group communication such as a video conference has been initiated, embodiments of the present disclosure provide for equitably managing the conference so that each participant can be given a chance to speak or contribute. For example, and according to one embodiment, the participants can be placed into a rotating queue based upon the order in which they joined the conference. As the conference progresses, each participant can be allowed to speak, while the other participants are muted, for up to a predetermined amount of time. Once that time expires, or the speaker yields the remaining time, the next participant in the rotating queue can be allowed to speak for up to the same predetermined amount of time. This rotation can continue for up to a predetermined number of rotations, a predetermined amount of time for the conference, or until the participants otherwise end the conference.

Various additional details of embodiments of the present disclosure will be described below with reference to the figures. While the flowcharts will be discussed and illustrated in relation to a particular sequence of events, it should be appreciated that changes, additions, and omissions to this sequence can occur without materially affecting the operation of the disclosed embodiments, configuration, and aspects.

FIG. 1 is a block diagram illustrating components of an exemplary computing device which may be used to implement various embodiments of the present disclosure. The computer system 100 is shown comprising hardware elements that may be electrically coupled via a bus 104. The hardware elements may include one or more central processing units (CPUs) 108; one or more input devices 112 (e.g., a mouse, a keyboard, etc.); and one or more output devices 116 (e.g., a display device, a printer, etc.). The computer system 100 may also include one or more storage devices 120. By way of example, storage device(s) 120 may be disk drives, optical storage devices, solid-state storage devices such as a random access memory ("RAM") and/or a read-only memory ("ROM"), which can be programmable, flash-updateable and/or the like.

The computer system 100 may additionally include a computer-readable storage media reader 124; a communications system 128 (e.g., a modem, a network card (wireless or wired), an infra-red communication device, etc.); and working memory 136, which may include RAM and ROM devices as described above. The computer system 100 may also include a processing acceleration unit 132, which can include a DSP, a special-purpose processor, and/or the like.

The computer-readable storage media reader 124 can further be connected to a computer-readable storage medium, together (and, optionally, in combination with storage device(s) 120) comprehensively representing remote, local, fixed, and/or removable storage devices plus storage media for temporarily and/or more permanently containing computer-readable information. The communications system 128 may permit data to be exchanged with a network and/or any other computer described above with respect to the computer environments described herein. Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information.

The computer system 100 may also comprise software elements, shown as being currently located within a working memory 136, including an operating system 140 and/or other code 144. It should be appreciated that alternate embodiments of a computer system 100 may have numerous variations from that described above. For example, customized hardware might also be used and/or particular elements might be implemented in hardware, software (including portable software, such as applets), or both. Further, connection to other computing devices such as network input/output devices may be employed.

Examples of the processors 108 as described herein may include, but are not limited to, at least one of Qualcomm® Snapdragon® 800 and 801, Qualcomm® Snapdragon® 120 and 115 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture. The computer system 100 may function as the systems, devices, or components described herein.

Figure 2:
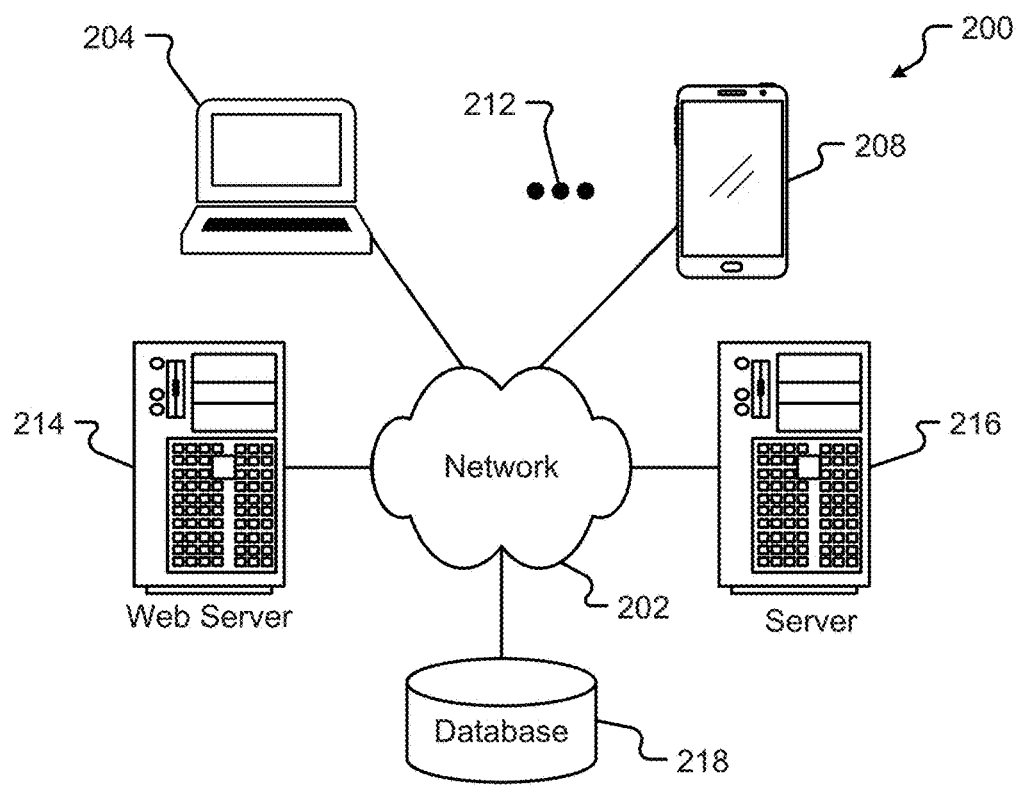
FIG. 2 is a block diagram illustrating components of an exemplary computing environment in which various embodiments of the present disclosure may be implemented.

FIG. 2 is a block diagram illustrating components of an exemplary computing environment in which various embodiments of the present disclosure may be implemented. The computing environment 200 includes one or more user computers, or computing devices as described above, such as a laptop of other personal computer 204, a communication device 208, and/or more 212. The computing devices 204, 208, 212 may include general purpose personal computers (including, merely by way of example, personal computers, and/or laptop computers running various versions of Microsoft Corp.'s Windows® and/or Apple Corp.'s Macintosh® operating systems) and/or workstation computers running any of a variety of commercially-available UNIX® or UNIX-like operating systems. These computing devices 204, 208, 212 may also have any of a variety of applications, including for example, database client and/or server applications, and web browser applications. Alternatively, the computing devices 204, 208, 212 may be any other electronic device, such as a thin-client computer, Internet-enabled mobile telephone, and/or personal digital assistant, capable of communicating via a network 202 and/or displaying and navigating web pages or other types of electronic documents or information. Although the exemplary computing environment 200 is shown with two computing devices, any number of user computers or computing devices may be supported.

The computing environment 200 may also include one or more servers 214, 216 also as described above. In this example, server 214 is shown as a web server and server 216 is shown as an application server. The web server 214, which may be used to process requests for web pages or other electronic documents from computing devices 204, 208, 212. The web server 214 can be running an operating system including any of those discussed above, as well as any commercially-available server operating systems. The web server 214 can also run a variety of server applications, including SIP (Session Initiation Protocol) servers, HTTP(s) servers, FTP servers, CGI servers, database servers, Java® servers, and the like. In some instances, the web server 214 may publish operations available operations as one or more web services.

The computing environment 200 may also include one or more file and or/application servers 216, which can, in addition to an operating system, include one or more applications accessible by a client running on one or more of the computing devices 204, 208, 212. The server(s) 216 and/or 214 may be one or more general purpose computers capable of executing programs or scripts in response to the computing devices 204, 208, 212. As one example, the server 216, 214 may execute one or more web applications. The web application may be implemented as one or more scripts or programs written in any programming language, such as Java®, C, C#®, or C++, and/or any scripting language, such as Perl, Python, or TCL, as well as combinations of any programming/scripting languages. The application server(s) 216 may also include database servers, including without limitation those commercially available from Oracle®, Microsoft®, Sybase®, IBM® and the like, which can process requests from database clients running on a computing device 204, 208, 212.

The web pages created by the server 214 and/or 216 may be forwarded to a computing device 204, 208, 212 via a web (file) server 214, 216. Similarly, the web server 214 may be able to receive web page requests, web services invocations, and/or input data from a computing device 204, 208, 212 (e.g., a user computer, etc.) and can forward the web page requests and/or input data to the web (application) server 216. In further embodiments, the server 216 may function as a file server. Although for ease of description, FIG. 2 illustrates a separate web server 214 and file/application server 216, those skilled in the art will recognize that the functions described with respect to servers 214, 216 may be performed by a single server and/or a plurality of specialized servers, depending on implementation-specific needs and parameters. The computer systems 204, 208, 212, web (file)

server 214 and/or web (application) server 216 may function as the system, devices, or components described herein.

The computing environment 200 may also include a database 218. The database 218 may reside in a variety of locations. By way of example, database 218 may reside on a storage medium local to (and/or resident in) one or more of the computers 204, 208, 212, 214, 216. Alternatively, it may be remote from any or all of the computers 204, 208, 212, 214, 216, and in communication (e.g., via the network 202) with one or more of these. The database 218 may reside in a storage-area network ("SAN") familiar to those skilled in the art. Similarly, any necessary files for performing the functions attributed to the computers 204, 208, 212, 214, 216 may be stored locally on the respective computer and/or remotely, as appropriate. The database 218 may be a relational database, such as Oracle 20i®, that is adapted to store, update, and retrieve data in response to SQL-formatted commands.

Figure 3:
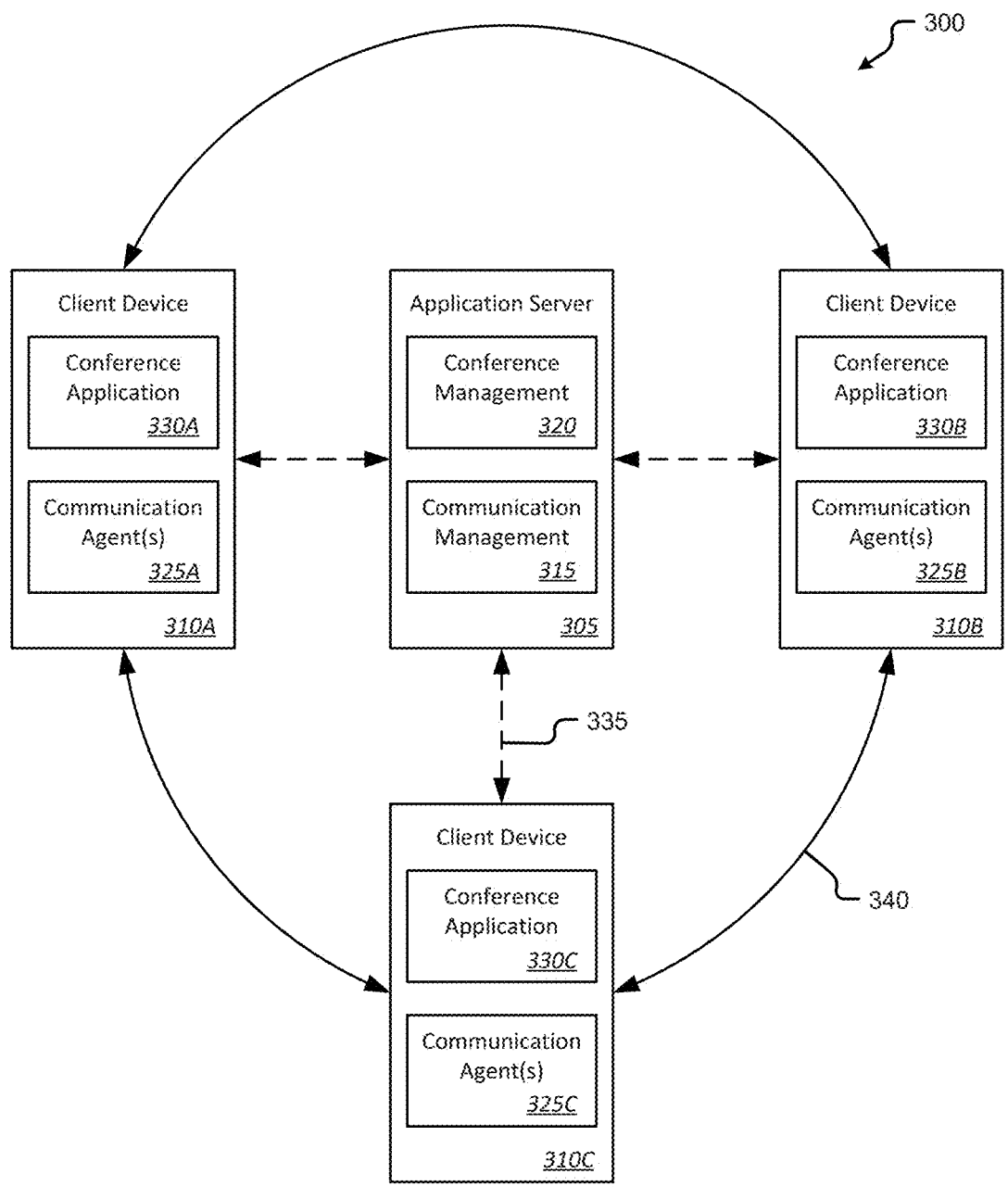
FIG. 3 is a block diagram illustrating components of an electronic group communication system according to one embodiment of the present disclosure.

FIG. 3 is a block diagram illustrating components of an electronic group communication system according to one embodiment of the present disclosure. As illustrated in this example, a system 300 can include an application server 305 as described above supporting a number of client devices 310A-310C. The client devices 310A-310C can communicate with the server 305 and each other over a network (not shown here) such as the Internet or another wide-area or local-area network as described above.

The application server 305 can execute a number of different applications including but not limited to one or more communication management applications 315 and/or one or more conference management applications 320. For example, the communication management application(s) 315 can comprise Web Real-Time Communication (WebRTC) and related server applications as known in the art. The conference management application(s) 320 can comprise one or more server applications to manage a conference communication session according to embodiments described herein.

Similarly, each client device 310A-310C can execute applications including but not limited to a communication agent 325A-325C and a conferencing application 330A-330C. Generally speaking, the communication agents 325A-325C can comprise applications allowing each client device 310A-310C to communicate with the application server 305 and/or each other. For example, the communication agents 325A-325C can comprise WebRTC agents and/or related applications. The conference applications 330A-330C can comprise applications, applets or "apps," scripts, e.g., a Jitsi script or Javascript, or other executable code, e.g., received from the application server 305 and/or another server (not shown here), which, when executed by the client devices 310A-310C, provides an interface and a number of conference functions as will be described herein.

It should be noted that, while illustrated here as a single server 305 for the sake of clarity and simplicity, the application server 305 can comprise one or more physical and/or virtual machines which may be co-located or distributed as known in the art. Similarly, while three client devices 310A-310C are illustrated here by way of example, any number of two or more client devices 310A-310C may join a conference as a participant or a spectator as will be described herein. The client devices 310A-310C can include any computing device capable of communicating within the system 300 and performing the functions as described herein and can include but are not limited to any combination of personal computers, laptops, tablets, cellphones, other mobile devices, etc. As noted, the client devices 310A-310C can communicate with the application server 305 and each other over one or more networks (not shown here) such as the Internet and/or another wide-area or local-area network including both wired and wireless networks. Other elements and components of the system 300 as commonly known in the art and used to support such communications are contemplated and considered to be within the scope of the present disclosure.

As known in the art, a group or conference communication such as a video conference can be initiated between the client devices 310A-310C through the application server 305. For example, a particular client device 310A operated by an originator of the conference can initiate a session with one or more other client devices 310B and/or 310C by requesting, through the WebRTC protocol, the application server 305 to establish a conference and invite the one or more other client devices 310B and/or 310C. As known in the art, to establish a WebRTC interactive flow (e.g., a real-time video, audio, and/or data exchange), clients devices 310A-310C may retrieve WebRTC-enabled web applications, such as HTML5/JavaScript web applications comprising the conference application 330A-330C and communication agents 325A-325C, from the application server 305 or another web application server. Through communication agents 325A-325C, the clients devices 310A-310C can then engage in a media negotiation to communicate and reach an agreement on parameters that define characteristics of the interactive session. In some embodiments, the media negotiation may be implemented via a WebRTC offer/answer exchange. A WebRTC offer/answer exchange and other signaling exchanges of the conference typically occurs via a secure network connection 335 such as a Hyper Text Transfer Protocol Secure (HTTPS) connection or a Secure Web Sockets connection. In a WebRTC offer/answer exchange, a first WebRTC client on a sender client device 310A, referred to herein as the originator, sends an "offer" to a second client device 310B referred to herein as a participant. The offer includes a WebRTC session description object that specifies media types and capabilities that the first WebRTC client supports and prefers for use in the WebRTC interactive flow. The second client device 310B can then respond with a WebRTC session description object "answer" that indicates which of the offered media types and capabilities are supported and acceptable by the second client device 310B for the WebRTC interactive flow. Additional client devices 310C can be invited and join in a similar manner. Once the media negotiation is complete, the client devices 310A-310C may then establish a direct peer connection 340 with one another, and may begin an exchange of media and/or data packets transporting real-time communications. The peer connection 340 between the clients devices can employ, for example, the Secure Real-time Transport Protocol (SRTP) to transport real-time media channels, and may utilize various other protocols for real-time data interchange.

Once the conference has been initiated, embodiments of the present disclosure provide for equitably managing the conference so that each participant can be given a chance to speak or contribute. For example, and according to one embodiment, the participants can be placed into a rotating queue based upon the order in which they joined the conference. As the conference progresses, each participant can be allowed to speak, while the other participants are muted, for up to a predetermined amount of time. Once that time expires, or the speaker yields the remaining time, the next participant in the rotating queue can be allowed to speak for up to the same predetermined amount of time. This rotation can continue automatically and without requiring action by the originator or participants for up to a predetermined number of rotations, a predetermined amount of time for the conference, or until the participants otherwise end the conference.

More specifically, the conference management application 320 of the application server 305 can generate a list of participants in a group communication as it is initiated and joined, beginning with the originator and proceeding with the participants in the order in which they accept the invitation and join the conference. The conference management application 320, through the communication management application 315 and the communication agents 325A-325C can place the client devices 310A-310C on mute while unmuting the first participant, e.g., the originator, via appropriate control signals 335 as known in the art such as an instruction to mute a microphone and or camera or to view only a stream from a particular client device. This will allow the client device 310A of the first participant in the list to exclusively stream audio and/or video to the other client devices 310B and 310C. This can continue for up to a predetermined amount of time during which the first participant can speak uninterrupted while the other participants can listen and/or watch the first participant. Once this predetermine time expires or the first participant yields the remaining time, e.g., by a user input through the conference application 330A of the client device 310A, the conference management application 320 of the application server 305 can mute the first participant and unmute the next participant in the ordered list of participants. This next participant can then be given up to the same predetermined amount of time to speak exclusively. This rotation can continue automatically and without requiring action by the originator or participants until the conference management application 320 determines that a predetermined number of rotations through the ordered list have been completed, a predetermined amount of time for the conference has expired, or until the participants otherwise end the conference. The predetermined number of rotations through the ordered list or the total time can be defined by default or may be selected or defined by the originator. Once expired, the conference management application 320, through the communication management application 310 and communication agents 325A-325C, can take down the conference as known in the art.

It should be noted that any number of participants can be added to a given conference. However, and according to one embodiment, the conference may be kept relatively small, e.g., two to five participants. According to one embodiment, the group can be selected from the originator's lists of contacts or may be invited in other ways, e.g., by an open invitation posted on a social media site etc., by a search conducted by the originator based on an intended topic of the discussion, and in other possible ways. Similarly, the amount of time given to each participant can be any amount of time. However, and according to one embodiment, the amount of time may be kept relatively short, e.g., less than ten minutes and, in some cases, 30 seconds to one minute. The amount of time may be defined by default or may be selected or defined by the originator. Keeping the group size relatively small and the time for each participant to speak relatively short is thought to provide greater equity, can allow the participants to be more engaged, and can provide a more effective and dynamic discussion. However, a larger group and/or longer time periods may be more suitable in some situations and can be utilized depending upon the exact use.

Figure 4:
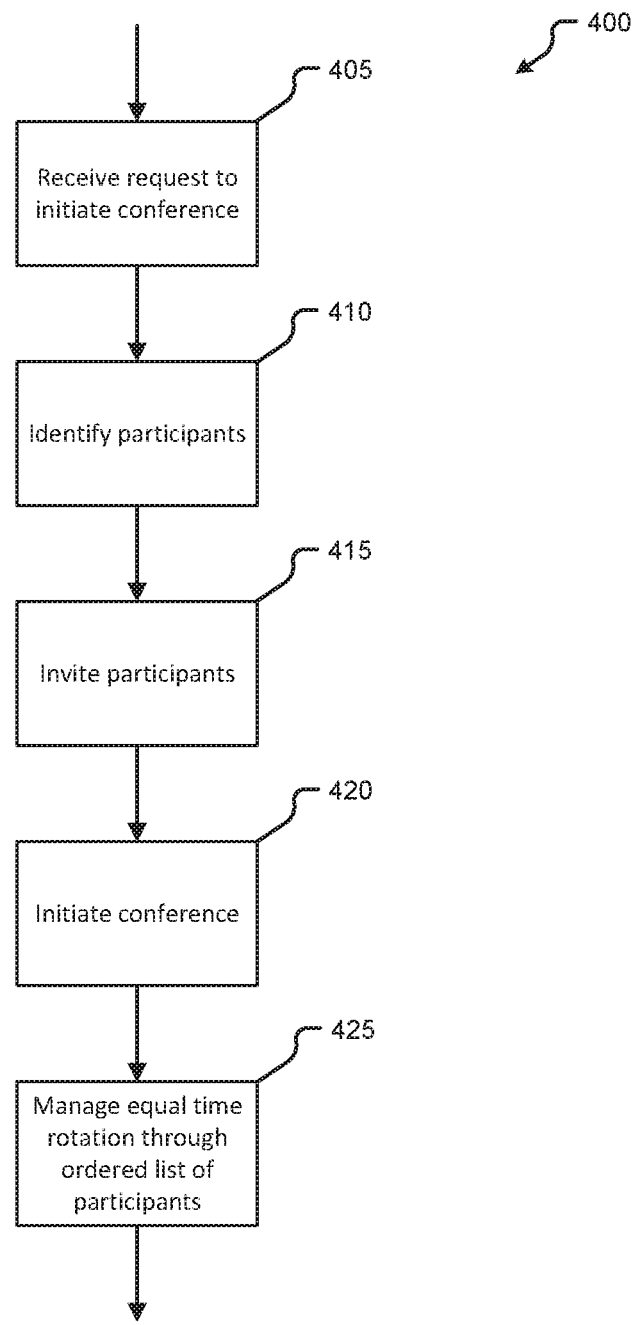
FIG. 4 is a flowchart illustrating an exemplary process for managing a group communication session according to one embodiment of the present disclosure.

FIG. 4 is a flowchart illustrating an exemplary process 400 for managing a group communication session according to one embodiment of the present disclosure. As illustrated in this example, managing a group communication session can comprise receiving 405 from a client device of an originator of the group communication session a request to initiate the group communication session. This can include an invitation or request to conduct a conference with another on or more participants. The one or more participants in the group communication session can be identified 410 based on the request, e.g., by a user name, number, or other unique identifier. The identified one or more participants can be invited 415 to join the group communication session. The group communication session can be initiated 420 in response to receiving an acceptance message from a client device of at least one of the one or more participants. According to one embodiment, invitees who did not accept can be allowed to view the session but not participate or speak. These parties are referred to herein as spectators. Once initiated, the group communication session can be managed 425 to provide a substantially equal amount of exclusive time to each of the originator of the communication session and the at least one of the one or more participants.

Figure 5:
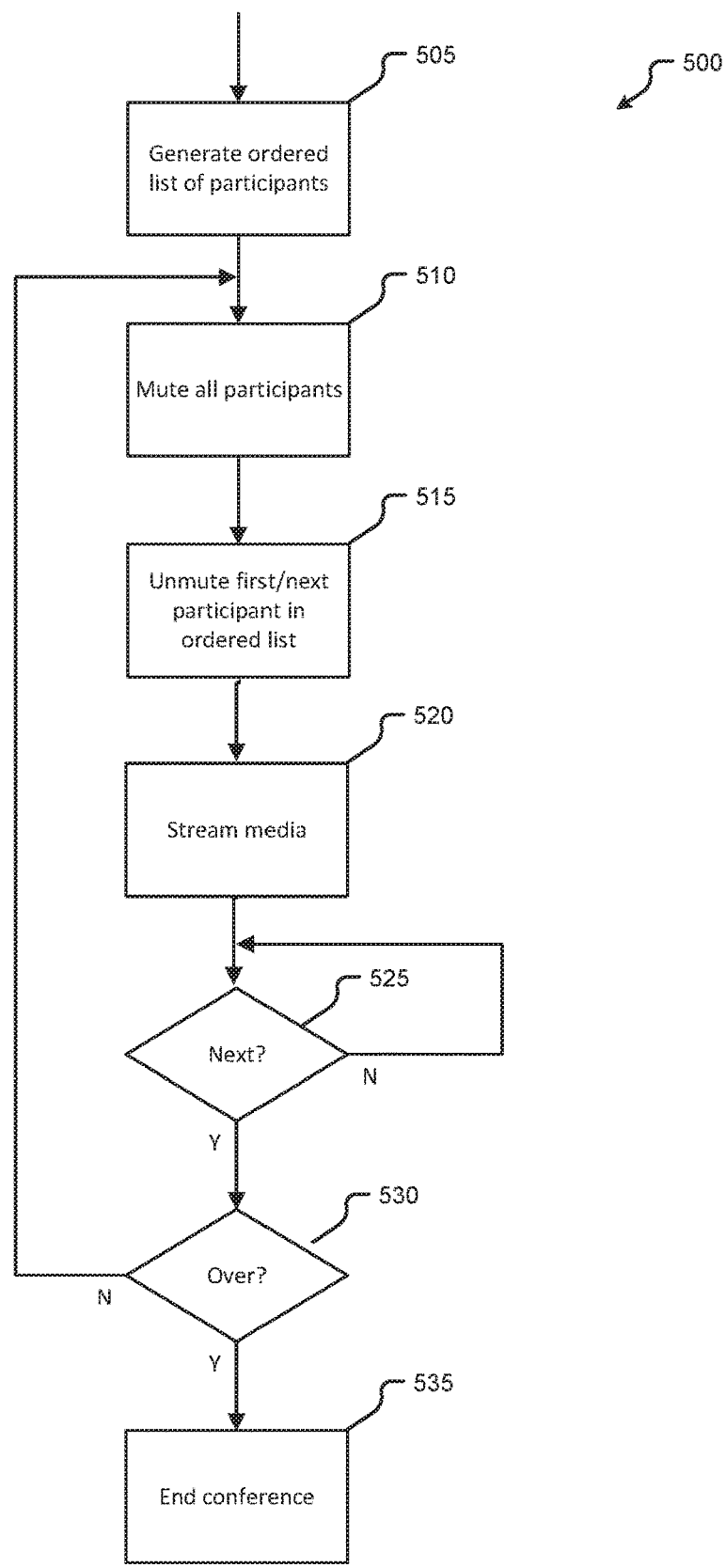
FIG. 5 is a flowchart illustrating additional details of managing an equal time rotation through an ordered list of participants in a group communication according to one embodiment of the present disclosure.

FIG. 5 is a flowchart illustrating additional details of a process 500 for managing an equal time rotation through an ordered list of participants in a group communication according to one embodiment of the present disclosure. As illustrated in this example, managing 425 the group communication session to provide a substantially equal amount of exclusive time to each of the originator of the communication session and the at least one of the one or more participants can comprise generating 505 an ordered list. The ordered list can comprise the originator of the communication session and the at least one of the one or more participants and the order of the ordered list can be based on when the acceptance message is received from the client device of the at least one of the one or more participants. In other words, the order of the list can comprise the originator first followed by the first participant to accept the invitation further followed by the next participant (if any) to accept the invitation and so on.

The client device of the originator and the client device of each of the at least one of the one or more participants muted 510, a first client device can be unmuted 515 based on the order of the ordered list, and media can be streamed 520 from the first client device to all participants in the group communication session for up to a predetermined amount of time. Since the originator is likely, but not necessarily, to be the first in the ordered list, the originator will have the first chance to speak at the beginning of the session. The muting 510, unmuting 515, and streaming 520 can be accomplished in different ways depending upon the exact implementation. For example, explicit instructions can be sent to the particular devices to mute those devices while unmuting the device of the speaker having the current turn. Alternatively, instructions can be sent to all devices to switch an active stream to that of the first device, i.e., the device of the participant having the current turn based on the ordered list, thereby making that stream the active stream presented on every device. Other alternatives are possible, depending upon the exact implementation, and considered to be within the scope of the present disclosure.

During streaming 520, a determination 525 can be made as to whether a predetermined amount of time has expired or a user input has been received from the first client device indicating a willingness of the user to move to the next speaker. In response to determining 525 the predetermined amount of time has expired or the user input has been received, the first client device can be muted 510, a second or next client device based on the order of the ordered list can be unmuted 515, and media can be streamed 520 from the second client device to all participants in the group communication session for up to the predetermined amount of time. In other words, once a participant's time has expired or that participant has indicated by an input, e.g., clicking a button of a user interface etc., through that participant's client device that she is done speaking and willing to pass the conversation to the next speaker, the session can turn to the next participant in line according to the order of the ordered list. Once again, muting 510, unmuting 515, and streaming 520 can be accomplished by sending explicit instructions to the first and second devices to mute and unmute, by sending instructions to all devices to switch an active stream to that of the second device, or by other means.

The process of muting 510, unmuting 515, and streaming 520, i.e., switching streams between participant client devices, based on the order of the ordered list can continue until a determination 525 is made that a predetermined number of rotations through the ordered list has been completed or a predetermined total time for the group communication session has expired. In response to determining 530 that the predetermined number of rotations through the ordered list has been completed or the predetermined total time for the group communication session has expired the group communication session can end 535.

According to embodiments of the present disclosure, a number of different variations and additional details can be utilized depending upon the exact implementation. For example, the client devices described above can present a user interface that can vary widely between implementations without departing from the scope of the present invention. Some exemplary user interfaces will be described below for illustrative purposes only. It should be understood that these examples are not intended to limit the scope of the present disclosure. Rather, they are offered by way of example only in an effort to give a more thorough understanding of some possible implementations of various embodiments described herein. It should be further understood that in different implementations these interfaces can differ in format and/or content without departing from the scope of the present disclosure.

Figure 6:
FIG. 6 is a screenshot illustrating an exemplary user interface for initiating a group communication according to one embodiment of the present disclosure.

FIG. 6 is a screenshot illustrating an exemplary user interface for initiating a group communication according to one embodiment of the present disclosure. More specifically, this example illustrates a user interface 600 including a list 605 of group communication sessions that the user has been invited to or may join. To join one of these sessions, the user can select, e.g., click, touch, etc., list element 610 representing the desired session to accept the invitation and be placed into that session.

Figure 7:
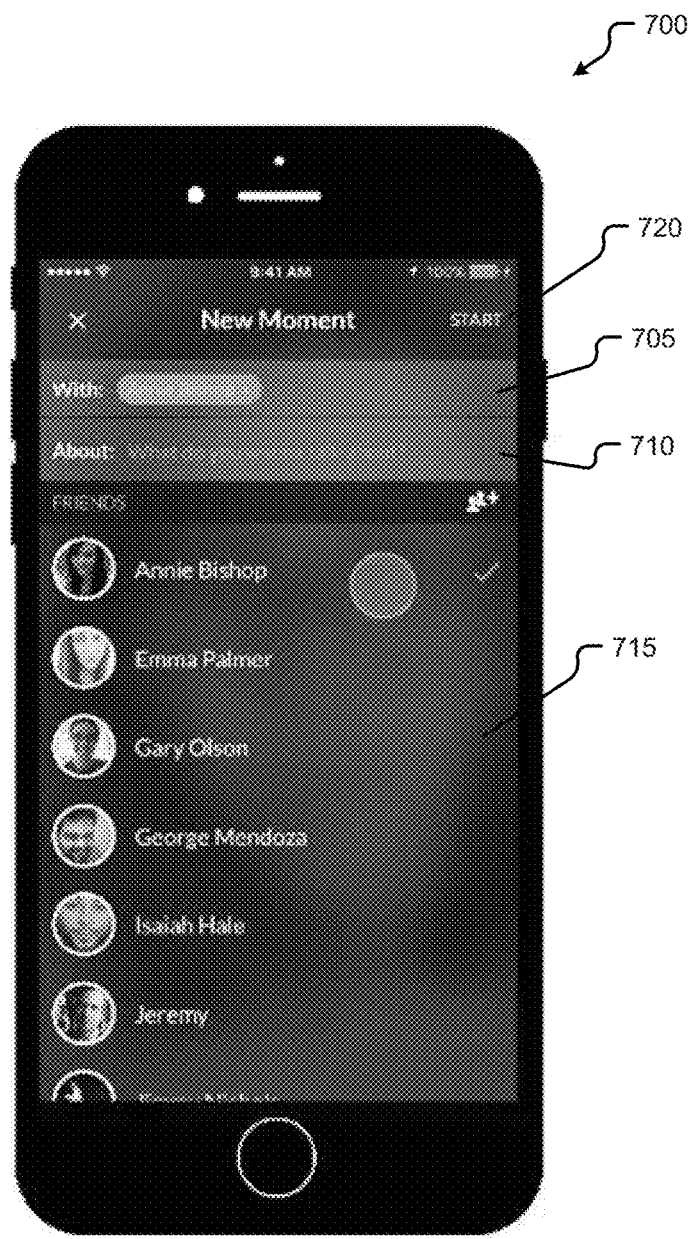
FIG. 7 is a screenshot illustrating an exemplary user interface for initiating a group communication according to another embodiment of the present disclosure.

FIG. 7 is a screenshot illustrating an exemplary user interface for initiating a group communication according to another embodiment of the present disclosure. More specifically, this example illustrates a user interface 700 through which a user can initiate a new group communication session. As illustrated here, the user can define the attendees by typing a name in a text field 705 or by selecting an attendee from a representation of the user's contacts 715. Additionally, the user can define a topic for the session by typing a subject in a text field 710. Once ready, the user can launch the session and invite the attendees by touching, clicking, or otherwise manipulating a "Start" element 720 such as an icon, link, button, etc.

Figure 8:
FIG. 8 is a screenshot illustrating an exemplary user interface for conducting a group communication according to one embodiment of the present disclosure.

FIG. 8 is a screenshot illustrating an exemplary user interface for conducting a group communication according to one embodiment of the present disclosure. More specifically, this example illustrates a user interface 800 through which a user can participate in a group communication. This interface includes a main window 805 or image which presents the stream of the current speaker, i.e., based on the ordered list. The interface 800 can also include a fixed or static representation or image 810 of each of the attendees in order based on the ordered list. According to one embodiment, these images can include an indication of the current speaker, e.g., by highlighting the current speaker.

Figure 9:
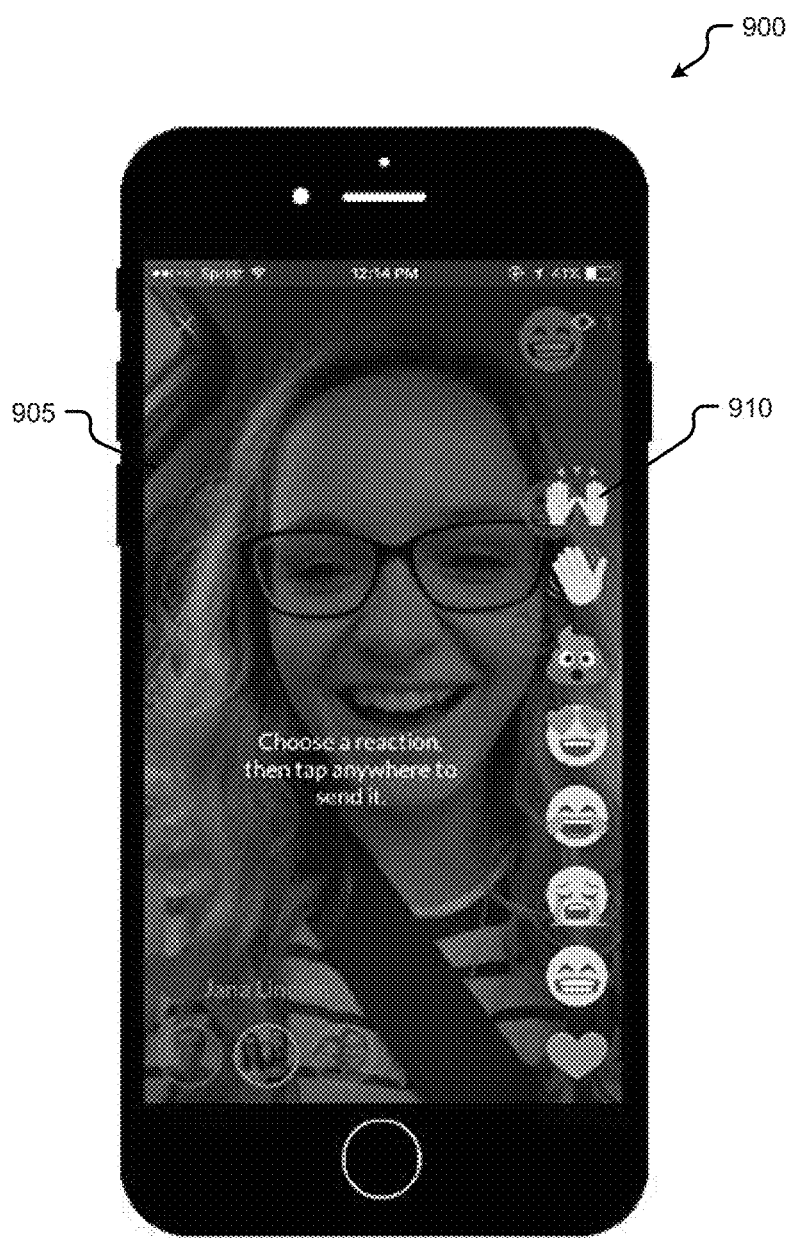
FIG. 9 is a screenshot illustrating an exemplary user interface for conducting a group communication according to another embodiment of the present disclosure.

FIG. 9 is a screenshot illustrating an exemplary user interface for conducting a group communication according to another embodiment of the present disclosure. More specifically, this example illustrates a user interface 900 through which a user can participate in a group communication. As with the example in FIG. 8, the current speaker is represented live in main portion 905 of the interface 900. Other participants are mute and do not participate other than listening/watching the speaker. However, according to one embodiment and as illustrated here, the listeners can add and send emojis. These emojis can be selected from a list 910, e.g., by touching clicking or otherwise manipulating the interface to indicate a selection and the selected emoji can be sent to all participants and displayed as an overlay on the current speaker.

Numerous other additional or alternative variations and details can be included depending upon the exact implementation. For example, and as described above, an auto start feature can be implemented in which, once a participant is in rotation and their turn is next it is automatically started once the previous speakers time expires. According to one embodiment, if the current speaker finish before the end of the period and wants to yield the remainder of the time, that participant can indicate such, e.g., by pressing an icon or button on the user interface. This will cause the session to move to the next participant in order who will then be streamed to all other participants for up to the predetermined time or until this participant indicates he is finished. Additionally or alternatively, a participant can remove herself from rotation, e.g., by tapping the representation of herself in representation the list of participants presented in the user interface and as described above. This participant's turn can then be skipped and returned to the order on next rotation. In an additional or alternative variation, once a participant's turn starts, if no voice is detected, i.e., the participant does not speak, for a predetermined amount of time e.g., 10 seconds, 30 seconds, etc., the turn can end and the session continued on to the next participant in order.

According to one embodiment, the user can search for conversations on topics of interest and/or by demographic, e.g., by geography, gender, age, interests, etc. Similarly, the user can post or broadcast conversations and the intended topic, thereby making the conversation available for others. In such cases, originators and/or participants can choose who to share the posts with, e.g., keep private or invite family, friends, followers, public, etc. Additionally or alternatively, spectators, i.e., non-participant attendees as noted above, can search interests and/or follow topics by community groups declaring their subject.

According to one embodiment, targeted advertising can be provided by subject of interest. For example, the subject can be declared in a subject line of the invitation to the real time discussion. During the discussion, an advertisement can be automatically generated and presented to the participants and/or spectators. That is, the advertisement can be generated and delivered in real time based on the subject of the current discussion, i.e., rather than predictive based on a history of user preferences, purchases, behaviors, etc. Participants are likely to be more receptive to such advertisements because they can be highly relevant to the current topic and in real-time during the discussion of that topic.

As described above, each participant can be provided a fixed, predetermined amount of time to speak on each rotation through the ordered list of participants. This fixed duration can be set by default, e.g., 30 sec, or selected and/or defined by the originator, e.g., 1 sec to 10 minutes. Similarly, the total time duration for the session or the number of rotations can be defined by default or by the originator. In other cases, the end time may be open and the session will end only when the participants leave or close the session. A number of variations can be used to implement this timing. For example, the total time for the session or number of rotations can be set or even extended by the originator, by the participants, e.g., by voting, by the spectators (if any), e.g., by voting, or algorithmically based on two or more of the above. Similarly, the time available to each participant can be set or even extended by the originator, by the participants, e.g., by voting, by the spectators (if any), e.g., by voting, or algorithmically based on two or more of the above.

Additionally or alternatively, the order of the ordered list can be modified in various embodiments. For example, an exception can be made to the fixed order of rotation through the participants for a particular participant that is deemed to be most knowledgeable about a topic or is otherwise contributing significantly to the discussion. Such a participant can be identified, for example, based on voting by the originator, participants, and/or spectators (if any). Voting can be done, for example, using an icon in the user interface, e.g., thumbs up/down, number of stars, etc. Based on this voting, a can be moved up in the order and/or, in some cases, may be given extra time. Similarly, a game-like feature may be additionally or alternatively implemented that allows spectators to "vote off" or "vote out" participants. Conversely, spectators and/or other participants may vote participants up or give them ratings that indicate an expertise or an ability to contribute to discussions. These ratings can be persistent and related to particular topics. When such a participant enters a group communication related to that topic, the participant may be given preferential treatment, e.g., made first in line.

According to one embodiment, an exception can be made to the ordering of the participants for those originators who are particularly popular or may otherwise have a large number of "followers." In such cases, originators with followers of "X" or greater may be given a speaking turn between each of the other participants in the group. For example, director or manager in a corporation may have many followers, e.g., peers, subordinates, customers, suppliers, etc. and can be given more turns during a discussion or a chance to moderate the discussion via turns between each other participant.

In some cases, a participant can be removed from a group communication. For example and according to one embodiment, an originator can remove any of the participants for bullying or not being relevant to topic, but not for having a minority view. This can be self governed by the groups. Spectators can also sound an alarm or alert if content is inappropriate, e.g., profane or offensive, which can be reported to the originator or the whole group. One spectator or participant can ignore the flagged participants. According to one embodiment, an originator can remove a participant form a whole group communication, e.g., based on reporting etc., and a spectator and/or participant can mute or ignore a particular one participant.

According to one embodiment, spectators can become participants in a group communication. For example, a waiting list can be established for spectators requesting to become active participants in an established group communication. Once one of the participants of the group exits, the next spectator in line from the waiting list can be brought into the group communication as a participant and can be added to the order list. According to one embodiment a spectator can skip to the front of the line on the waiting list if that spectator is a highly ranked member. This ranking can be algorithmic based on spectator, participant, and/or originator votes.

According to one embodiment, a set of group actionables or "next steps" can be generated as a result of a group communication. For example, after group communication is complete, a question can be generated and presented to all parties in the group such as "what would you like next steps to be?" Each person, e.g., originator, participant, and perhaps spectator, can speak type/write what he thinks the next steps taken should be. These replies can be aggregated and/or summarized and distributed to the group.

According to one embodiment, a group discussion can be directed to a topic such as a social impact of a corporate sponsor. For examples, corporations can sponsor discussion groups, express their social impact statement, and initiate discussions on topics related to that statement.

In some cases, discussions can be moderated by a human or virtual participant. Such a moderator can comprise a guide or director for the discussion on a particular topic. For example, in a discussion on religion or faith, the guide can comprise a participant, in the ordered list of participants and according to embodiments described above, that acts to direct the conversation by offering topics or direction based on a topic, e.g., a Topical Biblical Concordance (TBC). At each rotation through the ordered list, such a guide or director can share content relevant to the subject. For example, algorithms monitoring the group communication can detect up keywords and, based on those detected keywords, can ask questions, e.g., if the other participants would like more information related to the detected words or phrases, offer information on related topics, etc.

According to one embodiment, a group communication can be archived, i.e., saved for later viewing by spectators at a later time. According to one embodiment, the archiving can be based on how popular the group communication is, e.g., for the first 24 hour viewing. The more popular a particular group communication is, the longer it can be archived. In other cases, archiving can be done based on sponsorship, i.e., paid for by a broadcaster and/or advertiser.

The present disclosure, in various aspects, embodiments, and/or configurations, includes components, methods, processes, systems, and/or apparatus substantially as depicted and described herein, including various aspects, embodiments, configurations embodiments, sub combinations, and/or subsets thereof. Those of skill in the art will understand how to make and use the disclosed aspects, embodiments, and/or configurations after understanding the present disclosure. The present disclosure, in various aspects, embodiments, and/or configurations, includes providing devices and processes in the absence of items not depicted and/or described herein or in various aspects, embodiments, and/or configurations hereof, including in the absence of such items as may have been used in previous devices or processes, e.g., for improving performance, achieving ease and\or reducing cost of implementation.

The foregoing discussion has been presented for purposes of illustration and description. The foregoing is not intended to limit the disclosure to the form or forms disclosed herein. In the foregoing Detailed Description for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this Detailed Description, with each claim standing on its own as a separate preferred embodiment of the disclosure.

Moreover, though the description has included description of one or more aspects, embodiments, and/or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and/or configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method for managing a group communication session, the method comprising:
   receiving, by an application server from a client device of an originator of the group communication session, a request to initiate the group communication session;
   identifying, by the application server, a plurality of participants in the group communication session based on the request;
   inviting, by the application server, the plurality of participants to join the group communication session;
   initiating, by the application server, the group communication session in response to receiving an acceptance message from a client device of at least one of the plurality of participants;
   generating, by the application server, an ordered list, the ordered list comprising the originator of the communication session and the at least one of the plurality of participants, wherein generating the ordered list comprises inserting the originator between each of the plurality of participants in an order of the ordered list; and
   managing, by the application server, the group communication session according to the order of the ordered list to provide a predetermined equal amount of exclusive time to each of the at least one of the plurality of participants, wherein the predetermined amount of time is set by the originator of the group communication session.

2. The method of claim 1, wherein the order of the ordered list is based on when the acceptance message is received from a client device of each of the participants.

3. The method of claim 2, further comprising:
   muting, by the application server, the client device of the originator and the client device of each of the participants; and
   unmuting, by the application server, a first client device based on the order of the ordered list.

4. The method of claim 3, further comprising streaming media from the first client device to all participants in the group communication session for up to the predetermined equal amount of time.

5. The method of claim 4, wherein a predetermined amount of time for the originator is greater than the predetermined equal amount of time for the participants.

6. The method of claim 4, further comprising, in response to expiration of the predetermined equal amount of time for a participant associated with the first client device or receiving, by the application server, a user input from the first client device:
   muting, by the application server, the first client device;
   unmuting, by the application server, a second client device based on the order of the ordered list; and
   streaming media from the second client device to all participants in the group communication session for up to the predetermined amount of time.

7. The method of claim 6, further comprising continuing said muting, unmuting, and streaming based on the order of the ordered list for up to a predetermined number of rotations through the ordered list has been completed, a predetermined total time for the group communication session has expired, or all of the originator and participants exit the communication session.

8. The method of claim 1, wherein the managing the group communication session further comprises providing the predetermined equal amount of exclusive time to each of the participants unless one of the participants requests or is indicated to be skipped, exits, or yields at least a portion of the exclusive time.

9. The method of claim 1, further comprising:
   receiving, by the application server, from at least one of the plurality of participants invited to join the group communication session a non-acceptance message; and
   in response to the non-acceptance message, allowing, by the application server, a user associated with the non-acceptance message to be a spectator to the communication session, wherein the spectator can receive media of the communication session but is not identified in the ordered list of participants.

10. The method of claim 9, further comprising, when a participant exits the communication session, inviting at least one spectator to join the communication session as a participant in the communication session.

11. The method of claim 9, further comprising adding, by the application server, a virtual assistant to the ordered list.

12. The method of claim 11, wherein the virtual assistant provides one or more suggested topics for the communication session or direction for the communication session based on one or more topics of the communication session.

13. The method of claim 1, further comprising, when a participant to the communication session exits the communication session, adding the exiting participant as a spectator to the communication session, wherein the spectator can receive media of the communication session but is not identified in the ordered list of participants.

14. The method of claim 13, further comprising, after the exiting participant has been added as a spectator to the communication session, allowing the exiting participant to re-join the communication session as a participant.

15. A system comprising:
a processor; and
a memory coupled with and readable by the processor and having stored therein a set of instructions which, when executed by the processor, causes the processor to manage a group communication by:
receiving, from a client device of an originator of the group communication session, a request to initiate the group communication session;
identifying a plurality of participants in the group communication session based on the request;
inviting the plurality of participants to join the group communication session;
initiating the group communication session in response to receiving an acceptance message from a client device of at least one of the plurality of participants;
generating an ordered list, the ordered list comprising the originator of the communication session and the at least one of the plurality of participants, wherein generating the ordered list comprises inserting the originator between each of the plurality of participants in an order of the ordered list; and
managing the group communication session according to the order of the ordered list to provide a predetermined equal amount of exclusive time to each of the at least one of the plurality of participants, wherein the predetermined amount of time is set by the originator of the group communication session.

16. The system of claim 15, wherein the order of the ordered list is based on when the acceptance message is received from a client device of each of the participants.

17. The system of claim 16, further comprising:
muting the client device of the originator and the client device of each of the participants; and
unmuting a first client device based on the order of the ordered list.

18. The system of claim 17, further comprising streaming media from the first client device to all participants in the group communication session for up to the predetermined equal amount of time.

19. The system of claim 18, wherein the predetermined amount of time for the originator is greater than the predetermined amount of time for the participants.

20. The system of claim 18, further comprising, in response to expiration of the predetermined equal amount of time for a participant associated with the first client device or receiving, by the application server, a user input from the first client device:
muting the first client device;
unmuting a second client device based on the order of the ordered list; and
streaming media from the second client device to all participants in the group communication session for up to the predetermined amount of time.

21. The system of claim 20, further comprising continuing said muting, unmuting, and streaming based on the order of the ordered list for up to a predetermined number of rotations through the ordered list has been completed, a predetermined total time for the group communication session has expired, or all of the originator and participants exit the communication session.

22. The system of claim 15, wherein the managing the group communication session further comprises providing the predetermined equal amount of exclusive time to each of the participants unless one of the participants requests or is indicated to be skipped, exits, or yields at least a portion of the exclusive time.

23. A non-transitory computer-readable medium comprising a set of instructions stored therein which, when executed by a processor, causes the processor to manage a group communication by:
identifying a plurality of participants in the group communication session based on the request;
inviting the plurality of participants to join the group communication session;
initiating the group communication session in response to receiving an acceptance message from a client device of at least one of the plurality of participants;
generating an ordered list, the ordered list comprising the originator of the communication session and the at least one of the plurality of participants, wherein generating the ordered list comprises inserting the originator between each of the plurality of participants in an order of the ordered list; and
managing the group communication session according to the order of the ordered list to provide a predetermined equal amount of exclusive time to each of the at least one of the plurality of participants, wherein the predetermined amount of time is set by the originator of the group communication session.

24. The non-transitory computer-readable medium of claim 23, wherein the order of the ordered list is based on when the acceptance message is received from a client device of each of the participants.

25. The non-transitory computer-readable medium of claim 24, further comprising:
muting the client device of the originator and the client device of each of the participants; and
unmuting a first client device based on the order of the ordered list.

26. The non-transitory computer-readable medium of claim 25, further comprising streaming media from the first client device to all participants in the group communication session for up to the predetermined equal amount of time.

27. The non-transitory computer-readable medium of claim 26, wherein the predetermined amount of time for the originator is greater than the predetermined amount of time for the participants.

28. The non-transitory computer-readable medium of claim 26, further comprising, in response to expiration of the predetermined equal amount of time for a participant associated with the first client device or receiving, by the application server, a user input from the first client device:
muting the first client device;
unmuting a second client device based on the order of the ordered list; and
streaming media from the second client device to all participants in the group communication session for up to the predetermined amount of time.

29. The non-transitory computer-readable medium of claim 28, further comprising continuing said muting, unmuting, and streaming based on the order of the ordered list for up to a predetermined number of rotations through the ordered list has been completed, a predetermined total time for the group communication session has expired, or all of the originator and participants exit the communication session.

30. The non-transitory computer-readable medium of claim 23, wherein the managing the group communication session further comprises providing the predetermined equal amount of exclusive time to each of the participants unless one of the participants requests or is indicated to be skipped, exits, or yields at least a portion of the exclusive time.

* * * * *